United States Patent Office 2,935,535
Patented May 3, 1960

2,935,535

PROCESS FOR MAKING BETA-BROMOETHYL AROMATIC COMPOUNDS

Arthur A. Asadorian, Midland, Mich., assignor to The Dow Chemical Company, Midland, Mich., a corporation of Delaware No Drawing. Application August 28, 1957
Serial No. 680,668

6 Claims. (Cl. 260—651)

This invention concerns a process for making beta-bromoethyl aromatic compounds. It relates more particularly to improvements in a procedure and solvent reaction medium for carrying out the abnormal addition of hydrogen bromide to vinyl aromatic compounds, e.g. styrene.

U.S. Patent No. 2,082,946 makes beta-bromoethylbenzene by reacting hydrogen bromide with styrene in the presence of a peroxide while having the reactants dissolved in a solvent such as ethylbenzene, chlorobenzene or bromobenzene, which does not react with hydrogen bromide, and carrying out of the reaction at elevated temperatures, e.g. above 40° C.

The method has not been entirely satisfactory for the reason that the products obtained consist of a mixture of a minor, but substantial proportion of alpha-bromoethylbenzene, and a major proportion of beta-bromoethylbenzene. The formation of alpha-bromoethylbenzene as a by-product in the reaction is disadvantageous since it results in lower yields of the desired beta-bromoethylbenzene product and increases the difficulties of obtaining the beta-bromoethylbenzene in pure or substantially pure form.

It is a primary object of the invention to provide a novel and easily conducted process for preparing beta-bromoethylbenzenes from hydrogen bromide and vinyl aromatic compounds. Another object is to provide a process and a solvent reaction medium which results in the formation of beta-bromoethylbenzenes as the sole or principal reaction product of hydrogen bromide with vinyl aromatic compounds. A further object is to provide a process and solvent reaction medium for effecting the catalytic abnormal addition of hydrogen bromide to monovinyl aromatic compounds to form beta-bromoethylbenzenes. Other and related objects may appear from the following description of the invention.

According to the invention, beta-bromoethylbenzenes can readily be obtained by reacting hydrogen bromide with a vinyl aromatic compound at ordinary or elevated temperatures in the presence of a peroxide catalyst while having the reactants dispersed or dissolved in an organic liquid comprising a polyhalocarbon such as carbon tetrachloride or perchloroethylene or mixtures of such compounds, as the reaction medium, as hereinafter described.

Surprisingly, it has been found that carbon tetrachloride or perchloroethylene have an action of promoting the abnormal addition of hydrogen bromide to vinyl aromatic compounds in the presence of a peroxide catalyst with resultant formation of the corresponding beta-bromoethylbenzene as the sole or substantially the sole addition product, whereas closely related compounds, e.g. chloroform or trichloroethylene do not possess this property. The action of carbon tetrachloride or perchloroethylene appears to be synergistic in that the combination of such organic compounds and a peroxide catalyst has an enhanced action for effecting the abnormal addition of hydrogen bromide to the ethylenic unsaturation of monovinyl aromatic compounds.

Styrene is the preferred vinyl aromatic compound starting material. Other vinyl aromatic compounds such as vinyltoluene, vinylxylene, ethylvinylbenzene, isopropylstyrene, chlorostyrene, dichlorostyrene, ar-chlorovinyltoluene, ar-chlorovinylxylene, ar-chloroisopropylstyrene or divinylbenzene, can be used. Mixtures of any two or more of the vinyl aromatic compounds can also be used.

The vinyl aromatic compounds are usually employed in pure or substantially pure forms, e.g. commercial grades, and as a single compound rather than as mixtures of two or more of the compounds in order to obtain a single corresponding beta-bromoethylbenzene as the sole or substantially the sole addition product.

The liquid carbon tetrachloride or perchloroethylene employed as the reaction medium can be used in proportions ranging from at least 2, preferably from 4 to 10, parts by volume of the organic liquid per part by volume of the vinyl aromatic compound up to 100 parts by volume or more of the liquid reaction medium per part of the vinyl aromatic compound.

Liquid mixtures comprising carbon tetrachloride or perchloroethylene in predominant amount, e.g. 70 percent by volume or more, with a minor proportion not exceeding 30 percent by volume of the total mixture of a saturated aliphatic hydrocarbon containing from 5 to 9 carbon atoms in the molecule can also be used. Such mixtures are non-flammable and can advantageously by employed in the process.

It is important that the organic liquid reaction medium be employed in amounts corresponding to at least 2, preferably 5, parts by volume per part by volume of the vinyl aromatic compound employed, in order to prevent or substantially inhibit the formation of alpha-bromoethylbenzenes in the reaction. The liquid organic reaction medium is preferably used in amounts corresponding to from 5 to 10 parts by volume per part by volume of the vinyl aromatic compound, e.g. styrene, initially used.

The reaction can be carried out at temperatures between room temperature or thereabout and 150° C. and at atmospheric or superatmospheric pressure, e.g. at pressures of from 5 to 30 pounds per square inch guage pressure. The reaction is advantageously carried out at temperatures between 40° and 80° C. and at atmospheric pressure or thereabout.

The reaction is carried out in the presence of an organic per-oxy compound, e.g. a peroxide catalyst, which in combination with the carbon tetrachloride or perchloroethylene enhances formation of the beta-bromoethylbenzenes by the abnormal addition of the hydrogen bromide to the ethylenic unsaturation of the monovinyl aromatic compound, e.g. styrene. Suitable peroxide catalysts are benzoyl peroxide, lauryl peroxide, acetyl peroxide, di.-tert.-butyl peroxide, cumene hydroperoxide, diisopropylbenzene peroxide, tert.-butyl hydroperoxide and the like. The peroxide can be employed in amounts of from 0.1 to 5, preferably from 0.5 to 2, percent by weight of the total weight of the starting materials, i.e. the sum of the weights of the vinyl aromatic compound and the organic liquid reaction medium initially used.

It is important that the peroxide be present in the reaction mixture during the entire course of the reaction and in an amount corresponding to at least 0.1, preferably from 0.2 to 2, percent by weight of the mixture in order to avoid the tendency toward formation of alpha-bromoethylbenzenes in the reaction.

The peroxide can be mixed with, or added to, the starting solution of the liquid reaction medium and the vinyl aromatic compound, all at once in the desired proportion or in an alternate procedure can be added in increments or small portions throughout the course of the reaction such as to maintain the concentration of the peroxide at a value of about 0.1 percent by weight of the solution or above.

The process can be carried out batchwise or in continuous manner.

In practice, the monovinyl aromatic compound, e.g. styrene, is mixed with the carbon tetrachloride or perchloroethylene or a mixture thereof in the desired proportions. A peroxide catalyst is added, suitably in amount corresponding to at least 0.1 percent by weight of the solution. The mixture is maintained at reaction temperatures between room temperature and 100° C., preferably between 40° and 80° C. at atmospheric pressure or thereabout, and hydrogen bromide is introduced into the liquid mixture. The hydrogen bromide is usually fed to the reaction at about the rate it is consumed, although greater or lesser rates of feed can be used, and in amount sufficient to saturate the reaction mixture with respect to the hydrogen bromide. Usually, an amount of the hydrogen bromide slightly greater than that theoretically required to react with the minovinyl aromatic compound is employed and lesser amounts can be used. The reaction proceeds rapidly and is usually completed in a few seconds or less upon contact of the hydrogen bromide with the monovinyl aromatic compound in the liquid solvent reaction medium. Upon completing the hydrogen bromide addition reaction, the product can be recovered in usual ways, e.g. by distillation, suitably after removing excess hydrogen bromide.

In a preferred practice, the product is recovered by subjecting the reacted mixture to steam distillation at atmospheric pressure or thereabout to azeotropically distill at least a portion of the organic solvent, together with water from the main portion of the reaction product and thereafter subjecting the residue to fractional distillation. Such steam distillation of the reacted mixture is advantageous since it results in the neutralizing or decomposing of the residual amounts of peroxides in the reaction mixture and usually removes a major portion of the organic compound employed as the liquid reaction medium from the beta-bromoethylbenzene product. The beta-bromoethylbenzene product thus obtained can be further purified by fractional distillation or in some instances is of sufficiently high purity, e.g. 95 percent by weight or more of a single beta-bromoethylbenzene, as to be useful for many applications without further purification.

The following examples illustrate ways in which the principle of the invention has been applied, but are not to be construed as limiting its scope.

*Example I*

A charge of 600 ml. of monomeric styrene and 3,000 ml. of carbon tetrachloride containing 54 grams of dissolved benzoyl peroxide as catalyst, was placed in a glass reaction flask equipped with a reflux condenser and stirrer. The mixture was stirred and heated at temperatures between 70° and 75° C. while introducing gaseous hydrogen bromide into the liquid over a period of 1.65 hours. The hydrogen bromide was fed to the mixture at about the rate it was consumed in the reaction, and feed of the hydrogen bromide was continued until the mixture was saturated with respect to the HBr as indicated by the venting of hydrogen bromide through the reflux condenser. The reacted mixture was subjected to steam distillation by bubbling steam therethrough to separate the carbon tetrachloride solvent and destroy residual amounts of the peroxide catalyst. There was obtained 2989 ml. of carbon tetrachloride distillate. The residue was a light yellow colored oil. It was washed with a dilute aqueous solution of sodium carbonate and dried. There was obtained 955 grams of beta-bromoethylbenzene product as a light yellow colored liquid having a specific gravity of 1.377 at 25° C. It was analyzed and found to consist of substantially pure beta-bromoethylbenzene. The product contained 43.2 percent bromine by analysis and had a color value of 300 (APHA).

In contrast, when hydrogen bromide is reacted with monomeric styrene in ethylbenzene as the solvent medium at temperatures between 90° and 97° C. in the presence of benzoyl peroxide as catalyst, the product consists of approximately equal parts by weight of beta-bromoethylbenzene and alpha-bromoethylbenzene.

*Example II*

A charge of 675 grams (750 ml.) of monomeric vinyltoluene, consisting of 65 percent by weight of meta-vinyltoluene and 35 percent para-vinyltoluene, and 4785 grams (3000 ml.) of carbon tetrachloride containing 55 grams (1 percent by weight of the total mixture) of benzoyl peroxide as catalyst was placed in a glass reaction vessel equipped with a reflux condenser and stirrer. The mixture was stirred and gaseous hydrogen bromide introduced into the liquid at a rate corresponding to about 220 grams of the HBr per hour over a period of 3 hours. The temperature of the mixture increased from room temperature to 70° C. during the experiment. Upon completing the reaction the mixture contained 0.25 percent by weight of peroxide. The reacted mixture was subjected to steam distillation to separate the carbon tetrachloride solvent from the product. There was obtained 2972 ml. of recovered solvent. The residue was washed with a dilute aqueous solution of sodium carbonate and dried. There was obtained 934.5 grams (785 ml.) of beta-bromoethyltoluenes. It was distilled. There were obtained 179 grams of beta-bromoethyltoluene boiling at 119°–123.5° C. at 25 millimeters absolute pressure and 516 grams of beta-bromoethyltoluene boiling at 123.5°–125.5° C. at 25 millimeters and having a specific gravity of 1.291 at 25°/25° C. The beta-bromoethyltoluene fractions were analyzed by infrared analysis. The product contained no alpha-bromoethyltoluene.

*Example III*

A charge of 400 ml. of monomeric styrene 2000 ml. of carbon tetrachloride and 18 grams of benzoyl peroxide was placed in a glass reaction flask equipped with a reflux condenser and stirrer. The mixture was stirred and heated at temperatures between 62° and 69° C. while introducing gaseous hydrogen bromide into the liquid in total amount in excess of that theoretically required to convert the styrene to bromoethylbenzene in a period of 0.87 hour. The product was recovered employing procedure similar to that employed in Example I. There was obtained 562 grams of beta-bromoethylbenzene boiling at 109.5°–111.5° C. at 25 millimeters absolute pressure. The product was analyzed. It was pure beta-bromoethylbenzene.

For purpose of comparison, a mixture of 5 parts by volume of chloroform and 1 part by volume of styrene, together with 1 percent by weight of benzoyl peroxide based on the weight of the mixture, was reacted with gaseous hydrogen bromide at temperatures between 51° and 59° C., employing procedure similar to that just described. The dried organic liquid was analyzed by infrared analysis and found to consist of about 17 percent by weight of alpha-bromoethylbenzene, 80 percent of chloroform and only 3 percent of beta-bromoethylbenzene.

*Example IV*

A charge of 500 ml. of monomeric styrene and 1000 ml. of carbon tetrachloride containing 18 grams of benzoyl peroxide as a catalyst was heated at temperatures of 65°–71° C. while adding hydrogen bromide thereto in excess of the theoretical amount required to convert the styrene to bromoethylbenzene over a period of 1.77 hours. There was obtained 393.5 grams of liquid product distilling at 108°–112° C. at 25 millimeters pressure. It was analyzed and found to consist of 96 percent by weight of beta-bromoethylbenzene and 4 percent of alpha-bromoethylbenzene.

This experiment shows that decreasing the amount of the liquid carbon tetrachloride reaction medium to a volume ratio of 2:1, relative to the styrene starting material, increases the tendency toward the formation of alpha-bromoethylbenzene, whereas a volume ratio of 5 parts of carbon tetrachloride to 1 part of styrene starting material results in complete inhibition of the formation of alpha-bromoethylbenzene as shown in the preceding Example III.

*Example V*

A mixture of 1 part by volume of styrene and 5 parts by volume of perchloroethylene, together with 1 percent by weight of benzoyl peroxide, based on the weight of the mixture, was placed in a glass reaction vessel equipped with a reflux condenser and stirrer. The mixture was stirred and heated at temperatures between 60° and 75° C. while introducing gaseous hydrogen bromide into the liquid at about the rate it was consumed in the reaction. Feed of the hydrogen bromide to the mixture was continued until the reaction was complete as indicated by the venting of HBr through the reflux condenser. Thereafter, the reacted mixture was washed with a dilute aqueous solution of sodium carbonate and the organic liquid was separated and dried. A portion of the dried liquid was analyzed by infrared analysis and found to consist of 16 percent by weight of beta-bromoethylbenzene and 84 percent of perchloroethylene. No alpha-bromoethylbenzene was found. The liquid was distilled to recover the product. There was obtained beta-bromoethylbenzene as a liquid product boiling at 110°–113° C. at 25 millimeters absolute pressure.

For purpose of comparison a mixture of 1 part by volume of styrene and 5 parts by volume of trichloroethylene, together with 1 percent by weight of benzoyl peroxide based on the weight of the mixture was reacted with gaseous hydrogen bromide at temperatures between 68° and 76° C., employing procedure similar to that just described. The dried organic liquid was analyzed by infrared analysis and found to consist of 18 percent by weight of alpha-bromoethylbenzene and 82 percent of trichloroethylene. No beta-bromoethylbenzene was found.

I claim:
1. A process for making a beta-bromoethyl aromatic compound which comprises reacting hydrogen bromide with a vinyl aromatic compound while having the reactants dissolved in a liquid reaction medium comprising at least one organic compound selected from the group consisting of carbon tetrachloride and perchloroethylene, in amount corresponding to at least 2 parts by volume of the organic solvent per part by volume of the vinyl aromatic compound starting material, at reaction temperatures between 40° and 80° C., and in the presence of a small but effective amount of an organic peroxide as catalyst.

2. A process for making a beta-bromoethylbenzene which comprises reacting hydrogen bromide with a monovinyl aromatic compound of the benzene series while having the reactants dissolved in a liquid reaction medium comprising at least one organic compound selected from the group consisting of carbon tetrachloride and perchloroethylene, in amount corresponding to from 4 to 10 parts by volume of the organic solvent per part by volume of the monovinyl aromatic compound starting material, at temperatures between 20° and 150° C. and in the presence of a small but effective amount of an organic peroxide as catalyst, and separating the product from the reacted materials.

3. A process as claimed in claim 2, wherein the monovinyl aromatic compound is styrene.

4. A process as claimed in claim 2, wherein the monovinyl aromatic compound is vinyltoluene.

5. A process as claimed in claim 2, wherein the organic solvent is carbon tetrachloride.

6. A process as claimed in claim 2, wherein the organic solvent is perchloroethylene.

References Cited in the file of this patent

UNITED STATES PATENTS

| | | |
|---|---|---|
| 2,082,946 | Fluchaire et al. | June 8, 1937 |
| 2,468,208 | Kharasch | Apr. 26, 1949 |

OTHER REFERENCES

Mayo et al.: "Chem. Reviews," volume 27, page 380 (1940).